(12) United States Patent
Caye

(10) Patent No.: US 10,207,610 B2
(45) Date of Patent: Feb. 19, 2019

(54) ARTICULATING LOCKING MECHANISM FOR A SEATBACK

(71) Applicant: Ford Global Technologies, LLC, Dearborn, MI (US)

(72) Inventor: Mark Caye, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 15/455,365

(22) Filed: Mar. 10, 2017

(65) Prior Publication Data

US 2018/0257527 A1 Sep. 13, 2018

(51) Int. Cl.
*B60N 2/68* (2006.01)
*F16B 2/22* (2006.01)

(52) U.S. Cl.
CPC ............... *B60N 2/682* (2013.01); *F16B 2/22* (2013.01)

(58) Field of Classification Search
CPC ................................. B60N 2/682; F16B 2/22
USPC .......................................................... 297/353
See application file for complete search history.

(56) References Cited

U.S. PATENT DOCUMENTS

| | | | |
|---|---|---|---|
| 4,971,379 A * | 11/1990 | Rumpel | B60N 2/01583 248/503.1 |
| 5,685,612 A | 11/1997 | MacDonald et al. | |
| 8,528,977 B2 | 9/2013 | Naughton | |
| 8,720,847 B2 | 5/2014 | Reimann | |
| 9,132,748 B2 | 9/2015 | Park | |
| 2018/0043799 A1* | 2/2018 | Ayyash | B60N 2/22 |

* cited by examiner

*Primary Examiner* — Mark R Wendell
(74) *Attorney, Agent, or Firm* — Vichit Chea; Price Heneveld LLP

(57) ABSTRACT

An articulating locking mechanism includes a support bracket having a receiving slot and a retaining flange. A pivot member is received in the receiving slot. A retainer member includes a hook portion that is coupled to the pivot member at a first end of the retainer member along an outer surface of the support bracket. The retainer member is operable between at-rest and flexed positions. A second end of the retainer member retains the retainer member in the flexed position by engaging a retaining flange extending outwardly from an inner surface of the support bracket.

14 Claims, 8 Drawing Sheets

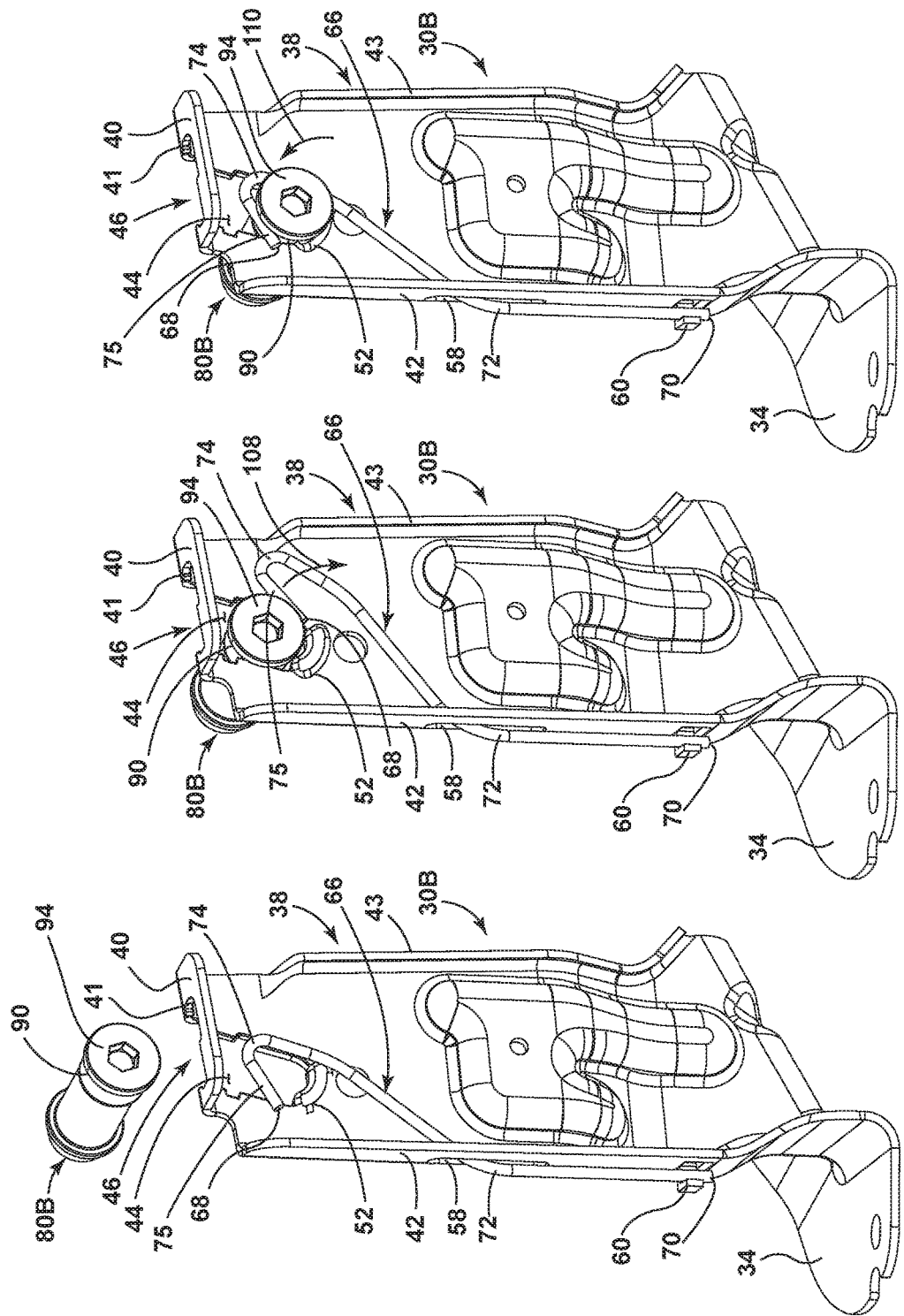

ARTICULATING LOCKING MECHANISM FOR A SEATBACK

FIELD OF THE INVENTION

The present invention generally relates to an articulating locking mechanism, and more particularly, to an articulating locking mechanism having a set-in-place lock configuration with a retaining bar and a noise dampening bumper.

BACKGROUND OF THE INVENTION

In the automotive industry, it is common to include a vehicle seat having a seat portion and a seatback, wherein the seatback is pivotally coupled to supporting features for the seat portion. In known seatback coupling systems, it is common to have a pivot member coupled to a receiving member disposed on a support bracket for the vehicle seat. The pivot member may include a nut and bolt configuration that is received through a receiving aperture in a support bracket. This type of pivoting connection takes a considerable amount of time to install, and is a likely source of vibration noise during the operation of a vehicle in which this coupling arrangement is installed. The present concept provides for a quick set-in-place style coupling between a support bracket and pivot member along with anti-vibration features to reduce noise during vehicle use, and a mechanical retaining structure.

SUMMARY OF THE INVENTION

One aspect of the present invention includes an articulating locking mechanism having a support bracket having an upright body portion with a receiving slot, an access aperture and a retaining flange disposed thereon. A pivot member is received in the receiving slot of the support bracket. A retaining bar includes a first end coupled to the pivot member and further includes a second end that is retained by the retaining flange of the support bracket.

Embodiments of the first aspect of the invention can include any one or a combination of the following features:
- a support bracket having retaining flange and a receiving slot;
- a flexibly resilient bumper disposed near the receiving slot;
- a pivot member vertically received in the receiving slot, wherein a portion of the pivot member abuts the flexibly resilient bumper; and
- a retaining bar having a hook portion coupled to the pivot member and a portion of the retaining bar engaged with the retaining flange.

Yet another aspect of the present invention includes an articulating locking mechanism a support bracket having a receiving slot and a retaining flange. A pivot member is received in the receiving slot. A retainer member includes a hook portion that is coupled to the pivot member at a first end of the retainer member. The retainer member further includes a second end that is operable between at-rest and flexed positions. The second end of the retainer member is retained in the flexed position by the retaining flange of the support bracket.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6A is a top perspective view of the pivot member and support bracket of FIG. 2 with the pivot member disposed above the receiving slot of the support bracket and the retaining bar coupled with the support bracket;

FIG. 6B is a top perspective view of the pivot member and support bracket of FIG. 6A with the retaining bar in flexed position as the pivot member urges aside the hook portion of the retaining bar; and FIG. 6C is a top perspective view of the pivot member fully seated within the receiving channel of the support bracket with the retaining bar having returned to an at-rest position from the flexed position of FIG. 6B, such that the hook portion of the retaining bar is coupled to the pivot member.

DETAILED DESCRIPTION OF THE PREFERRED EMBODIMENTS

Figure 1A:
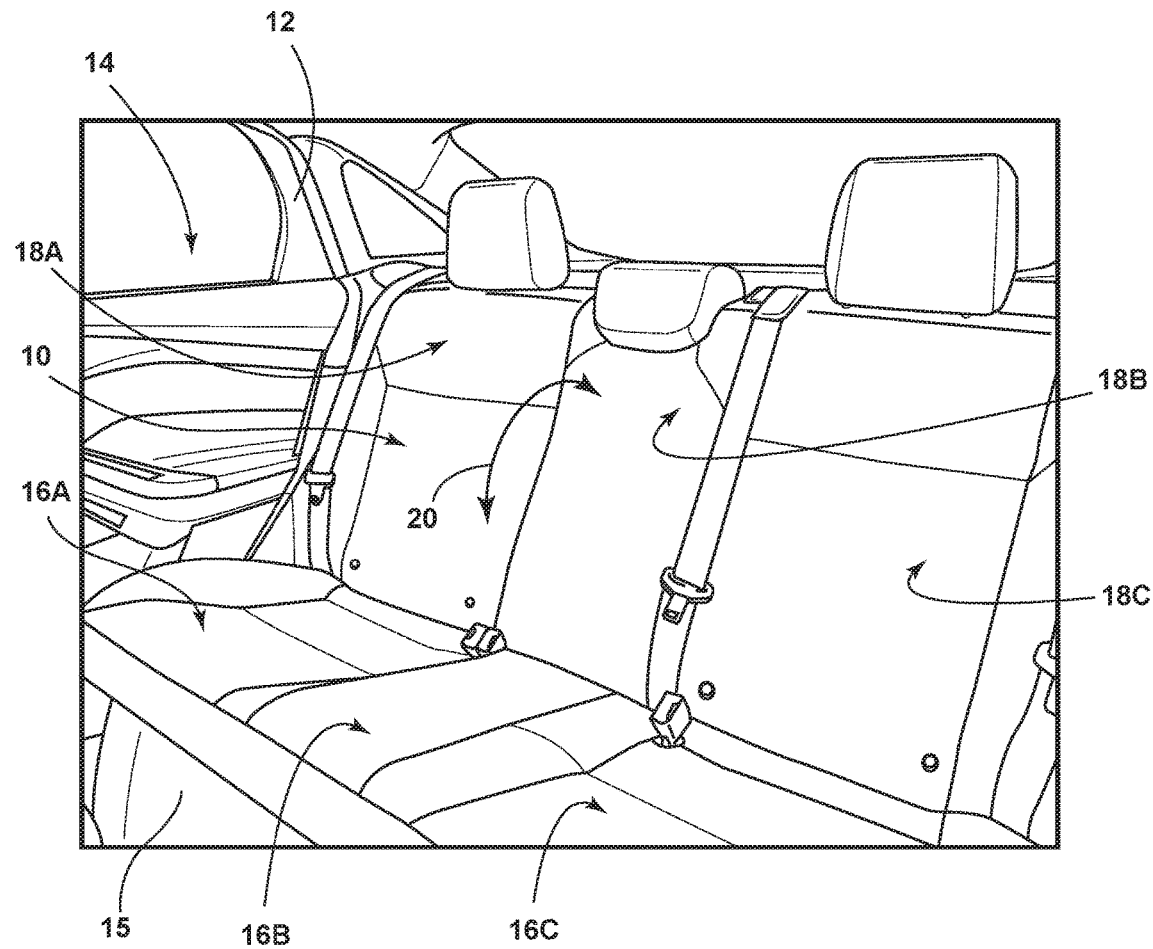
FIG. 1A is a front perspective view of a rear seat assembly disposed in a vehicle interior and having a seat portion and seatback.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a rear seat assembly 10 is shown disposed within a vehicle interior 14 of a vehicle 12. The rear seat assembly 10 includes seat portions 16A, 16B and 16C, as well as seatback portions 18A, 18B, and 18C setup in a bench-style rear seat configuration. The seatback portions 18A, 18B, and 18C are contemplated to be pivotally coupled to the vehicle 12 for pivoting adjustment along the path indicated by arrow 20 between upright and folded-down positions. The rear seat assembly 10 of FIG. 1A is shown as a rear seat assembly, however, it is contemplated that the present invention may be used in a vehicle seat assembly located in any location within a vehicle interior, including driver and passenger seats, rear seats, and third row passenger seat options. As such, the rear seat assembly 10 shown in FIG. 1A is not intended to limit the spirit of the present invention to a particular vehicle seat arrangement in any manner.

In the embodiment shown in FIG. 1A, the rear seat assembly 10 is contemplated to include seatback frame members for supporting seatback portion 18A in an independent manner relative to seatback portions 18B, 18C. The configuration of a seatback frame assembly is described below with reference to FIG. 1B. Further, it is contemplated that the seatback portions 18A, 18B, and 18C may all operate independently of one another depending on the seatback frame configuration used to support the seatback portions 18A, 18B, and 18C.

Figure 1B:
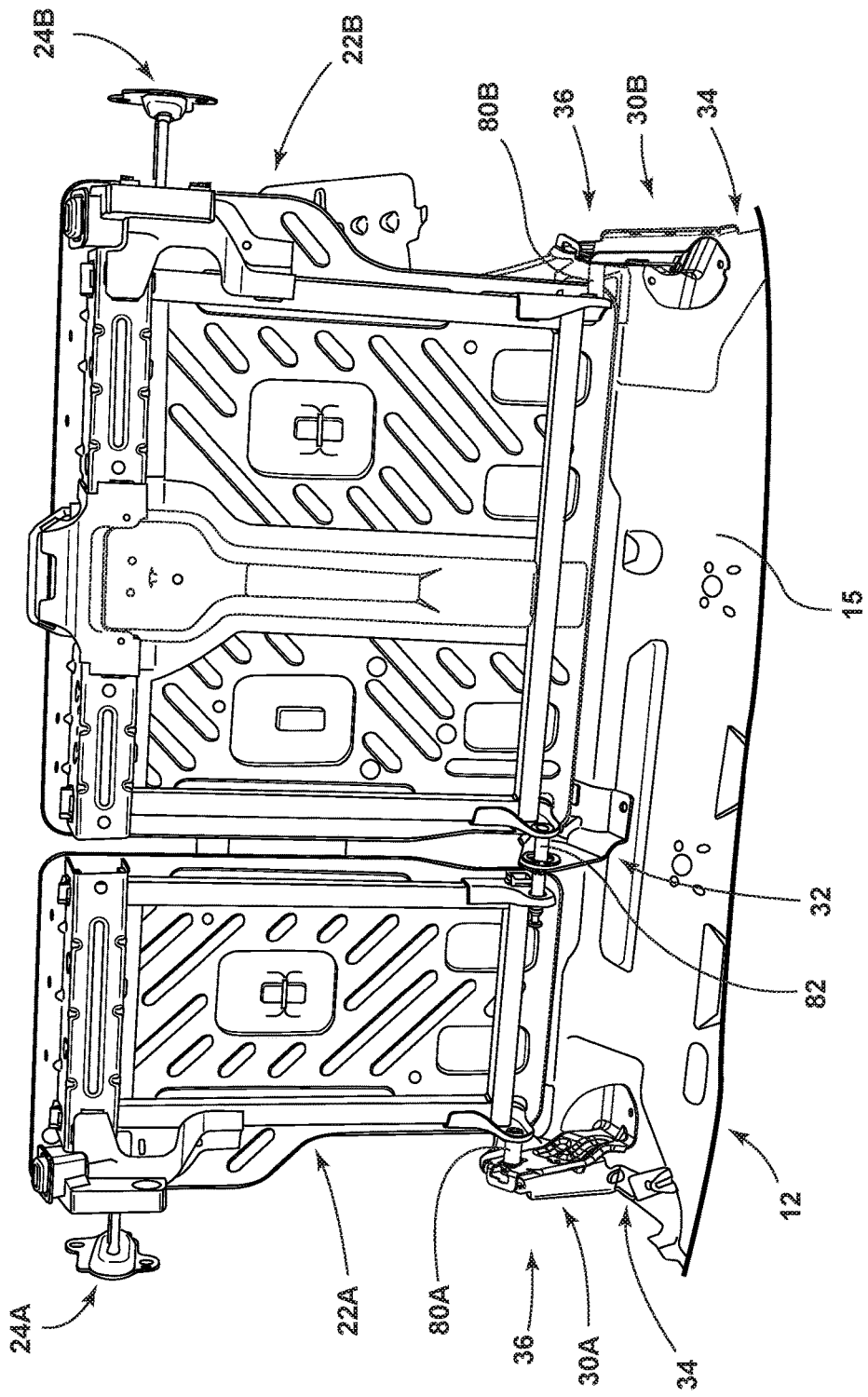
FIG. 1B is a front perspective view of a seatback frame of the rear seat assembly of FIG. 1A coupled to a vehicle frame.

Referring now to FIG. 1B, the seat portions 16A, 16B, and 16C have been removed as well as the cushioned material covering seatback portions 18A, 18B, and 18C in FIG. 1A to reveal seatback frame members 22A, 22B shown in upright positions relative to a vehicle frame 15. The vehicle frame 15 is contemplated to be a stamped metal part having support brackets 30A, 30B coupled thereto in a spaced-apart relationship. The support brackets 30A, 30B are outer support brackets configured to support the seatback frame members 22A, 22B in an articulating manner between upright and folded down positions. Thus, in FIG. 1B, seatback frame member 22A is contemplated to provide the structural support for seatback portion 18A, while seatback frame member 22B is contemplated to provide the structural support for seatback portions 18B and 18C shown in FIG. 1A. With the seatback frame members 22A, 22B shown in the upright position in FIG. 1B, the seatback frame members 22A, 22B are engaged with locking mechanisms 24A and 24B disposed on opposite sides of the vehicle 12. The locking mechanisms 24A, 24B may be included to selectively retain the seatback frame members 22A, 22B in their respective upright positions. When the locking mechanisms 24A, 24B are released by a user, the seatback frame members 22A, 22B can be folded downward for access to a rear cargo area of the vehicle 12 and/or to provide a flat surface within the interior 14 of the vehicle 12. Other means of retaining the frame members 22A, 22B in upright use positions are also contemplated.

In the embodiment shown in FIG. 1B, an intermediate support bracket 32 is shown supporting the seatback frame members 22A, 22B at the pivot member 82 thereof. The support brackets 30A, 30B and intermediate support bracket 32 are contemplated to be coupled to the vehicle frame 15 by fasteners, welding, or other known attachment techniques common in the vehicle industry. Each support bracket 30A, 30B includes an anchor portion 34 and a riser portion 36. The anchor portion 34 is coupled to the vehicle frame 15, while the riser portion 36 extends upwardly from the anchor portion 34 to couple to pivot members 80A, 80B extending outwardly from lower portions of the seatback frame members 22A, 22B on opposite sides thereof.

Figure 2:
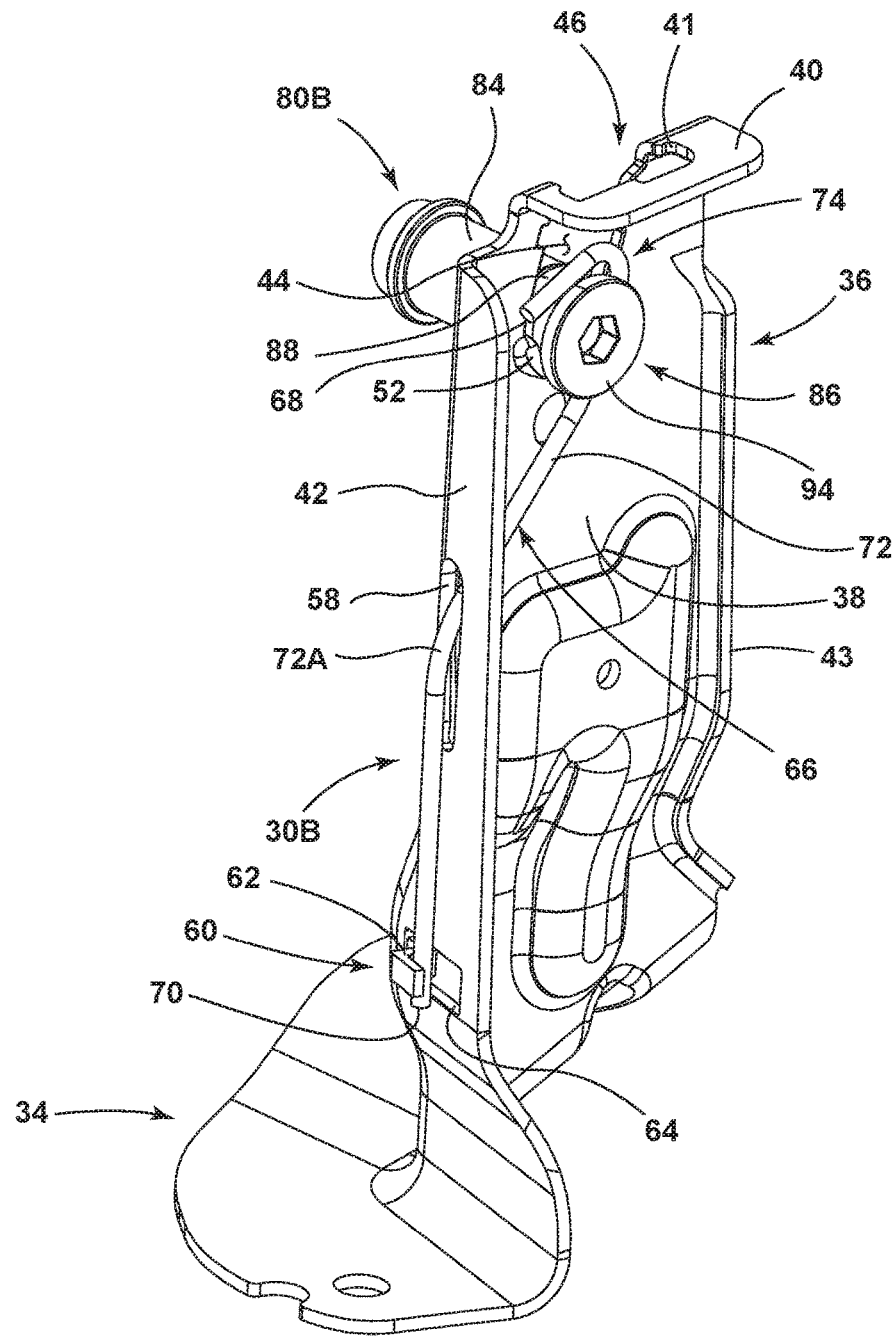
FIG. 2 is a top perspective view of a support bracket of the seatback frame of FIG. 1B with a pivot member received in a receiving slot of the support bracket.
Figure 3:
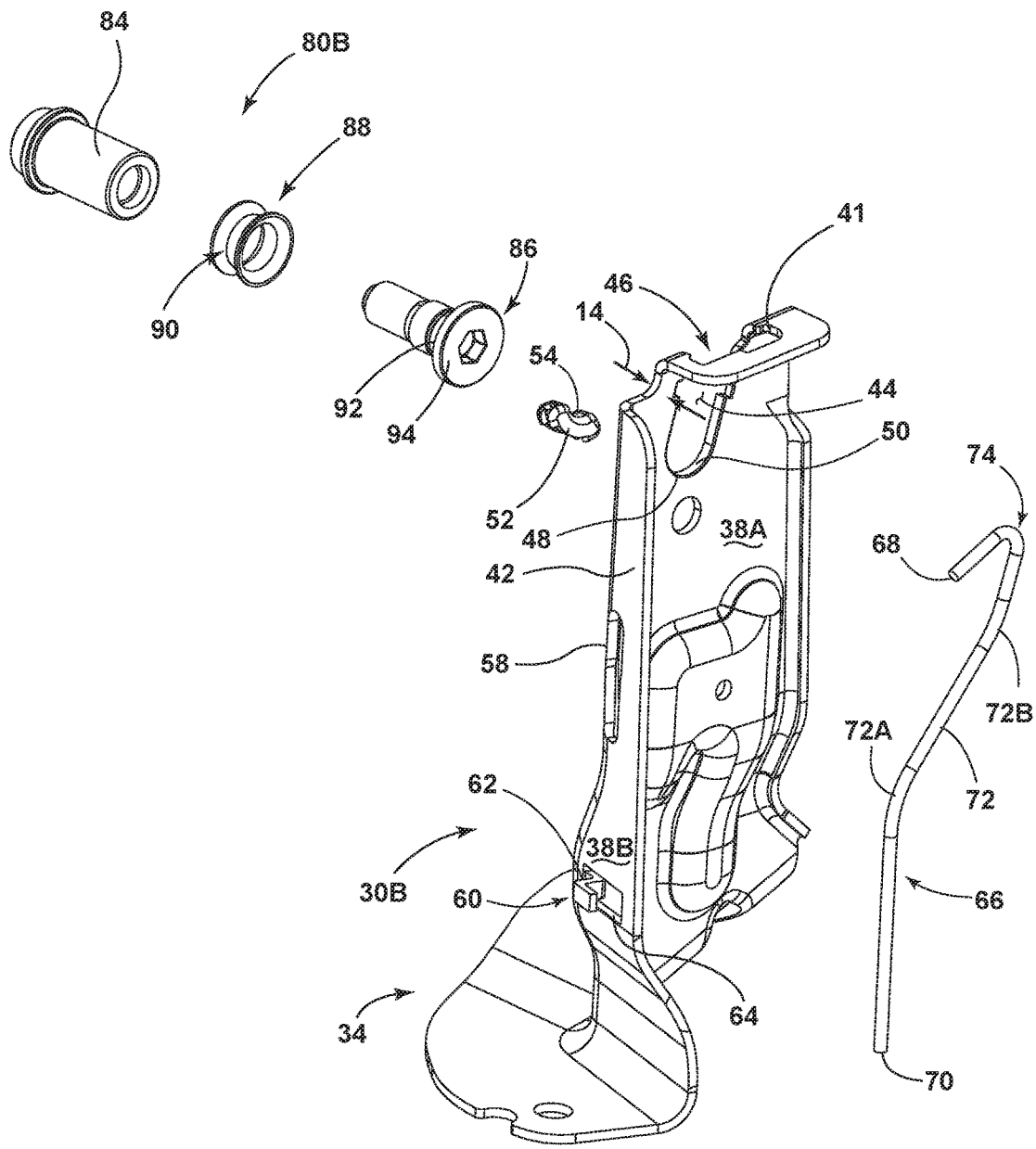
FIG. 3 is a top perspective view of the support bracket of FIG. 2 having the pivot member and a retaining bar exploded away therefrom.

Referring now to FIG. 2, support bracket 30B is shown from a top perspective view. The following description of bracket 30B is also relevant to the support bracket 30A which is essentially a mirror image of support bracket 30B. As shown in FIG. 2, the riser portion 36 of the support bracket 30B is generally defined by a centrally disposed body portion 38 having an upper mounting tab 40 extending outwardly from the body portion 38, and front and rear sidewalls 42, 43. In the embodiment of FIG. 2, the front and rear sidewalls 42, 43 extend outwardly from the body portion 38 in a generally orthogonal direction. The riser portion 36 further includes a receiving slot 44 disposed through the body portion 38. The receiving slot 44 includes an open top portion 46 and a closed bottom portion 48 to define an upwardly an outwardly opening receiving slot 44, as best shown in FIG. 3. The receiving slot 44 is shown in FIG. 3 as an upwardly opening receiving slot for vertical reception of a pivot member, such as pivot member 80B shown received in the receiving slot 44 in FIG. 2. It is contemplated that the receiving slot 44 can also be an outwardly opening slot that is not necessarily configured to be upwardly opening. Horizontally configured slots or other angled configurations are contemplated as alternative embodiments for the receiving slot 44 of the present concept. The upper mounting tab 40 includes a cutout portion 41 which opens into the open top portion 46 of the receiving slot 44 to provide access to the receiving slot 44 for the pivot member 80B.

With specific reference to FIG. 3, the receiving slot 44 is shown disposed through the body portion 38 of the upright riser 36, such that a rim portion 50 of the receiving slot 44 is defined by a material thickness M of the body portion 38. The body portion 38 includes an outer surface 38A and an inner surface 38B. A bumper 52 is configured for reception on the rim portion 50 of the receiving slot 44 at the closed bottom portion 48, as shown in FIG. 2. The bumper 52 includes an upper contact surface 54 which is a curved upper contact surface in the embodiment shown in FIG. 3. The bumper 52 is contemplated to be a flexibly resilient member that is used as an anti-vibration or noise dampening device, as further described below. The entire bumper 52 may be curved to accommodate the curved closed bottom portion 48 of the receiving slot 44, and also to accommodate a lower surface of the pivot member 80B which abuts the bumper 52 in assembly, as further described below. In another embodiment, the bumper 52 may also be positioned on the inner surface 38B or outer surface 38A near the receiving slot 44, so long as the bumper 52 can contact the pivot member 80B in assembly.

With further reference to FIG. 3, the front sidewall 42 of the support bracket 30B includes an access aperture 58 disposed therethrough. In the embodiment shown in FIG. 3, the access aperture 58 is an elongate access aperture configured to receive a portion of a retaining bar therethrough, as further described below. In use, the access aperture 58 allows for access to opposing sides (outer surface 38A and inner surface 38B) of the support bracket 30B for a retaining bar as detailed below. As further shown in FIG. 3, the front sidewall 42 includes a retaining flange 60 outwardly extending from the front sidewall 42 at the inner surface 38B of the support bracket 30B. The retaining flange 60 includes an L-shaped body portion 62 disposed over an aperture 64. In use, the retaining flange 60 is configured to retain a portion of a retaining bar as further, described below.

With further reference to FIG. 3, a retaining bar 66 is shown exploded away from the support bracket 30B and includes first and second ends 68, 70 with a body portion 72 disposed therebetween. The body portion 72 includes a number of offset angled portions 72A, 72B to provide an overall configuration of the retaining bar 66 that can couple to the pivot member 80B along the outer surface 38A of the support bracket 30B, while also coupling to the retaining flange 60 of the support bracket 30B on the inner surface 38B of the support bracket 30B. This configuration is shown in FIG. 2, wherein the retaining bar 66 is coupled to both the pivot member 80B and the support bracket 30B. As further shown in FIG. 2, the body portion 72 of the retaining bar 66 extends through the access aperture 58 disposed on the front sidewall 42 of the support bracket 30B. In this way, the second end 70 can be retained by the retaining flange 60 as shown in FIG. 2. The first end 68 of the retaining bar 66 includes a hook portion 74 which is configured to wrap around the pivot member 80B to retain the pivot member 80B in a fully seated position in the receiving slot 44 of the support bracket 30B. As shown in FIG. 2, the hook portion 74 retains the pivot member 80B on the outer surface 38A of the support bracket 30B. The retaining bar 66 is shown in FIG. 3 in the form of a spring hook retainer member that is contemplated to be a flexible member operable between at-rest and flexed positions. In FIG. 3, the retaining bar 66 is shown as a retainer member in an at-rest position. The retaining bar 66 is shown in FIG. 2 in a flexed position, wherein the retaining bar 66 is engaged with both the pivot member 80B and the retaining flange 60 of the support bracket 30B on opposite surfaces 38A, 38B of the support bracket 30B, respectively.

As further shown in FIG. 3, pivot member 80B is shown in an exploded view. The pivot member 80B is substantially similar to pivot member 80A (FIG. 1B), such that the description of pivot member 80B also describes the features of pivot member 80A as well. The pivot member 80B includes an outer portion 84 in the form of an outer sleeve that is configured to couple to the seatback frame members 22A, 22B, as shown in FIG. 1B. The outer portion 84 is rotatably supported on an inner portion 86. Specifically, the inner portion 86 is shown in FIG. 3 as a shoulder bolt having a support shaft 92 and a head portion 94. The outer portion 84 is rotatably supported on the support shaft 92 of the shoulder bolt 86. A bushing 88 is configured to be received between the outer portion 84 and the head portion 94 of the shoulder bolt 86 on the support shaft 92. The bushing 88 includes an outwardly opening curved channel 90 that is received in the receiving slot 44 of the support bracket 30B as shown in FIG. 2. Specifically, the closed bottom portion 48 of the receiving slot 44 is received in the outwardly opening curved channel 90 of the bushing 88. It is contemplated that the hook portion 74 of the retaining bar 66 may be received in the outwardly opening channel 90 of the bushing 88 of the pivot member 80B. Further, it is also contemplated that the hook portion 74 of the retaining bar 66 may otherwise be coupled to the pivot member 80B in such a way that the hook portion 74 is retained by the head portion 94 of the pivot member 80B in assembly, as shown in FIG. 2. With the outer portion 84 rotatably supported on the inner portion 86, the pivot member 80B defines a pivoting member which allows for a seatback frame member to articulate as fixedly coupled to the outer portion 84. It is contemplated that the pivot member 80B may be a metallic part as it relates to the inner and outer portions 86, 84. It is further contemplated that the bushing 88 may be a metal component or a polymeric component wrapped around the pivot member 80B.

Figure 4A:
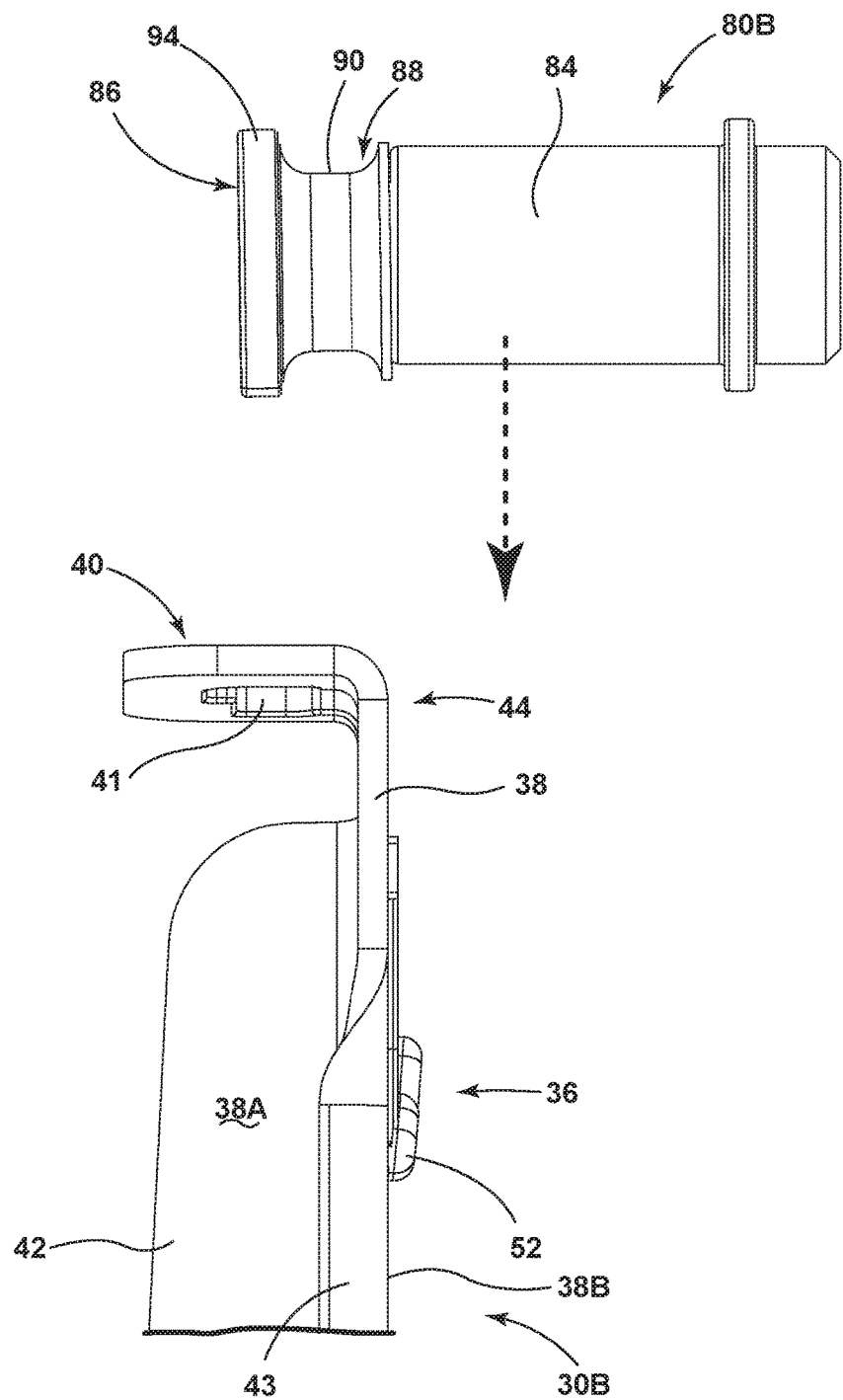
FIG. 4A is a fragmentary rear elevational view of the support bracket and pivot member of FIG. 2 showing relative movement of the pivot member into the receiving slot of the support bracket.

Referring now to FIG. 4A, the pivot member 80B is shown in a disengaged position above the riser 36 of support bracket 30B. As the pivot member 80B approaches the receiving slot 44 of the support bracket 30B, the head portion 94 is received through the cutout portion 41 and the busing 88 is aligned with the receiving slot 44.

Figure 4B:
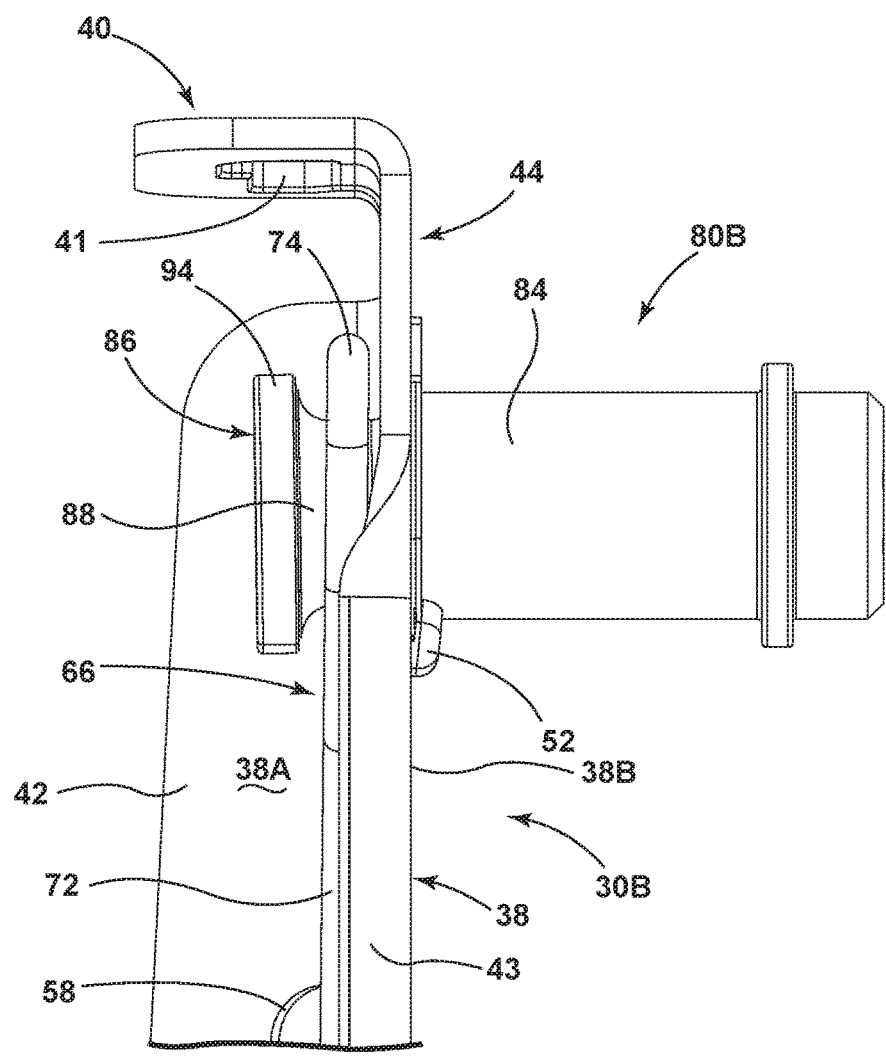
FIG. 4B is a fragmentary rear elevational view of the pivot member and support bracket of FIG. 4A with the pivot member fully seated in the receiving slot of the support bracket and the retaining bar coupled thereto.

Referring now to FIG. 4B, the pivot member 80B is shown fully seated in the receiving slot 44 of the support bracket 30B. With the pivot member 80B fully seated in the receiving slot 44 of the support bracket 30B, the head portion 94 is positioned along the outer surface 38A of the support bracket 30B, while the outer portion 84 is disposed along the inner surface 38B of the support bracket 30B. The bumper 52 is shown in contact with a lower portion of the pivot member 80B to act as a noise/vibration reducing feature.

Figures 5A, 5B, 5C:
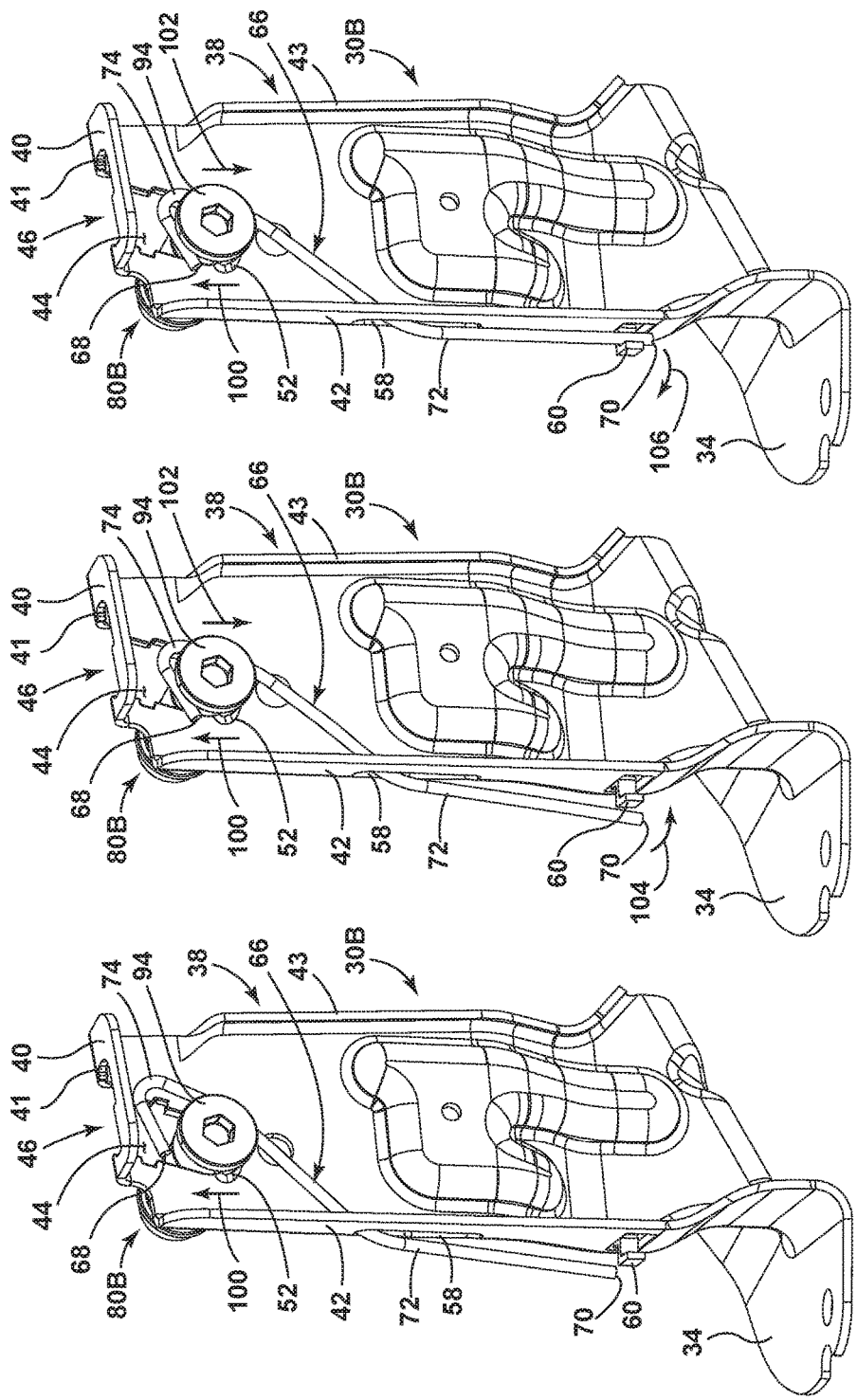
FIG. 5A is a top perspective view of the pivot member and support bracket of FIG. 2 with the pivot member fully seated in the receiving slot of the support bracket and showing relative movement of the retaining bar into a coupled position with the pivot member and support bracket.
FIG. 5B is a top perspective view of the pivot member and support bracket of FIG. 5A with the retaining bar in an at-rest position with a hook portion of the retaining bar coupled to the pivot member.
FIG. 5C is a top perspective view of the pivot member and support bracket of FIG. 5B with the retaining bar in a flexed position with an end portion of the retaining bar coupled to a retaining flange of the support bracket.

Referring now to FIGS. 5A-5C, the pivot member 80B is shown fully seated in the receiving slot 44 of the support bracket 30B. With the pivot member 80B fully seated in the receiving slot 44 of the support bracket 30B, the bumper 52 contacts a lower portion of the pivot member 80B to act as a noise/vibration reducing feature by imparting an upward force on the pivot member 80B in a direction as indicated by arrow 100. In FIG. 5A, the retaining bar 66 disengaged with both the pivot member 80B and the support bracket 30B. Specifically, the hook portion 74 of the retaining bar 66 is disposed above the pivot member 80B in FIG. 5A, and the second end 70 of the retaining bar 66 is positioned away from the retaining flange 60 of the support bracket 30B. In FIG. 5B, the retaining bar 66 has been lowered to engage the pivot member 80B. Specifically, the hook portion 74 of the retaining bar 66 is disposed around the pivot member 80B in FIG. 5B. In this way, the retaining bar 66 can impart a downward force on the pivot member 80B as indicated by arrow 102. This downward force counteracts the upward force of the bumper 52 and ensures sustained contact between the bumper 52 and the pivot member 80B. In FIG. 5B, the second end 70 of the retaining bar 66 has been lowered relative to FIG. 5A, but is still positioned away from the retaining flange 60 of the support bracket 30B. In FIG. 5C, the retaining bar 66 is engaged with the pivot member 80B and the support bracket 30B. Specifically, the hook portion 74 of the retaining bar 66 is disposed around the pivot member 80B in FIG. 5C, and the second end 70 of the retaining bar 66 has been moved inwardly, relative to FIG. 5B, to engage the retaining flange 60 of the support bracket 30B. Thus, the retaining bar 66 is in the at-rest position in FIGS. 5A and 5B and is in the flexed position in FIG. 5C. The retaining bar 66 is retained in the flexed position by the engagement of the second end 70 of the retaining bar 66 with the retaining flange 60 if the support bracket 30B. Specifically, the retaining bar 66 moves around the L-shaped body portion 62 of the retaining flange 60 in a direction as indicated by arrow 104 (FIG. 5B) to engage the retaining flange 60 in the flexed position. In the flexed position, the retaining bar 66 imparts a downward force (102) on the pivot member 80B to keep the pivot member 80B fully seated in the receiving slot 44 of the support bracket 30B, and also imparts an outwardly acting force 106 (FIG. 5C) on the retaining flange 60 at the second end 70 of the retaining bar 66, to keep the retaining bar 66 in position.

Referring now to FIGS. 6A-6C, the pivot member 80B is shown in progressive steps between a disengaged position and an engaged position with support bracket 30B. With specific reference to FIG. 6A, the pivot member 80B is shown disposed above the support bracket 30B. Specifically, the pivot member 80B is disposed directly above the receiving slot 44 of the support bracket 30B. The retaining bar 66 is shown coupled to the support bracket 30B by the engagement of the second end 70 of the retaining bar 66 being captured by the retaining flange 60. The hook portion 74 of the retaining bar 66 is disposed adjacent to the receiving slot 44 of the support bracket 30B.

Referring now to FIG. 6B, the pivot member 80B is shown partially inserted into the receiving slot 44 of the support bracket 30B. As the pivot member 80B is moved downwardly within the receiving slot 44 of the support bracket 30B, the pivot member 80B contacts a downwardly angled portion 75 of the hook portion 74 to move the retaining bar 66 to a flexed position (FIG. 6B) from an at-rest position 75 (FIG. 6A) along the path as indicated by arrow 108. Specifically, it is contemplated that the downwardly angled portion 75 of the hook portion 74 of the retaining bar 66 contacts the channel 90 of the pivot member 80B to move the retaining bar 66 to the flexed position as shown in FIG. 6B.

Referring now to FIG. 6C, as the pivot member 80B is further moved downwardly along the receiving channel 44 of the support bracket 30B to a fully seated position, the pivot member 80B will clear the first end 68 of the retaining bar 66. Once the first end 68 is cleared, the retaining bar 66 snaps back towards the at-rest position shown in FIG. 6, wherein the pivot member 80B is captured at the hook portion 74 of the retaining bar 66. Movement of the retaining bar 66 back towards the at-rest position from the flexed position is indicated by arrow 110. Thus, as illustrated in FIGS. 6A-6C, the pivot member 80B can be vertically inserted into the support member 30B at the receiving channel 44 in a set-in-place style reception, wherein the retaining bar 66 retains the pivot member 80B in the receiving slot 44 of the support bracket 30B at the hook portion 74 of the retaining bar 66.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An articulating locking mechanism, comprising:
    a support bracket with an upright body portion having a central portion with a receiving slot and an outwardly extending sidewall with an access aperture disposed therethrough;
    a retaining flange outwardly extending from an inner surface of the sidewall;
    a pivot member received in the receiving slot; and
    a retaining bar having a first end coupled to the pivot member and a second end retained by the retaining flange.

2. The articulating locking mechanism of claim 1, wherein the receiving slot includes an open top portion and a closed bottom portion.

3. The articulating locking mechanism of claim 2, wherein the receiving slot further includes a rim portion.

4. The articulating locking mechanism of claim 3, including:
    a bumper disposed on the rim portion of the receiving slot, wherein the bumper is a flexibly resilient member.

5. The articulating locking mechanism of claim 1, wherein the pivot member includes an outer portion rotatably supported on an inner portion, and further wherein a bushing is disposed between the outer portion and the inner portion.

6. The articulating locking mechanism of claim 5, wherein the bushing is received in a closed bottom portion of the receiving slot when the pivot member is received in the receiving slot.

7. The articulating locking mechanism of claim 6, including:
    a bumper disposed between the bushing and the closed bottom portion of the receiving slot when the pivot member is received in the receiving slot.

8. The articulating locking mechanism of claim 1, wherein the retaining bar includes a body portion disposed between the first and second ends thereof, and further wherein the body portion of the retaining bar extends through the access aperture of the support bracket.

9. The articulating locking mechanism of claim 8, wherein the first end of the retaining bar includes a hook portion disposed around the pivot member on an outer surface of the support bracket.

10. An articulating locking mechanism, comprising:
a support bracket having inner and outer surfaces, a retaining flange outwardly extending from the inner surface, and a receiving slot;
a flexibly resilient bumper disposed near the receiving slot;
a pivot member vertically received in the receiving slot, wherein a portion of the pivot member abuts the flexibly resilient bumper; and
a retaining bar engaged with the retaining flange and having a hook portion coupled to the pivot member along the outer surface of the support bracket.

11. The articulating locking mechanism of claim 10, wherein the support bracket includes an access aperture, and further wherein the retaining bar extends through the access aperture.

12. An articulating locking mechanism, comprising:
a support bracket having a receiving slot and a retaining flange;
a pivot member received in the receiving slot;
a bumper disposed on the receiving slot, wherein the bumper is a flexibly resilient member that contacts a portion of the pivot member when the pivot member is received in the receiving slot, and further wherein the bumper imparts an upward force on the pivot member when the pivot member is fully seated in the receiving slot; and
a retainer member operable between flexed and at-rest positions and having a first end coupled to the pivot member, wherein the retainer member is retained in the flexed position by a second end of the retainer member being engaged with the retaining flange.

13. The articulating locking mechanism of claim 12, wherein the pivot member includes an outer sleeve rotatably supported on a support shaft and a bushing disposed on the support shaft between the outer sleeve and a head portion of the pivot member.

14. The articulating locking mechanism of claim 12, wherein the retainer member imparts a downward force on the pivot member when the retainer member is retained in the flexed position.

* * * * *